US005285393A

United States Patent [19]

Abele et al.

[11] Patent Number: 5,285,393

[45] Date of Patent: Feb. 8, 1994

[54] METHOD FOR DETERMINATION OF OPTIMUM FIELDS OF PERMANENT MAGNET STRUCTURES WITH LINEAR MAGNETIC CHARACTERISTICS

[75] Inventors: Manlio G. Abele, New York; Henry Rusinek, Great Neck, both of N.Y.

[73] Assignee: New York University, New York, N.Y.

[21] Appl. No.: 794,997

[22] Filed: Nov. 19, 1991

[51] Int. Cl.[5] .............................................. G06F 15/46

[52] U.S. Cl. .................................... 364/468; 335/306; 335/301

[58] Field of Search ............... 335/297, 298, 301, 302, 335/303, 304, 305, 306; 29/DIG. 95, DIG. 105, 605; 364/468

[56] References Cited

U.S. PATENT DOCUMENTS

| | | | |
|---|---|---|---|
| 4,998,083 | 3/1991 | Abele | 335/306 |
| 5,063,934 | 11/1991 | Rapoport et al. | 335/297 |
| 5,089,798 | 2/1992 | Miyata | 335/297 |
| 5,119,057 | 6/1992 | Abele | 335/304 |

OTHER PUBLICATIONS

M. G. Abele. Properties of the Magnetic Field in Yokeless Permanent Magnets. TR-18 New York University Mar. 1. 1988.

*Primary Examiner*—Jerry Smith
*Assistant Examiner*—Brian C. Oakes
*Attorney, Agent, or Firm*—Rosen, Dainow & Jacobs

[57] ABSTRACT

The invention is directed to a method for determining the fields of permanent magnet structures with a surface or boundary solution method for the magnetic material with linear characteristics with small susceptibility and large permeabilities of the ferromagnetic materials.

7 Claims, 11 Drawing Sheets

FIG. 3
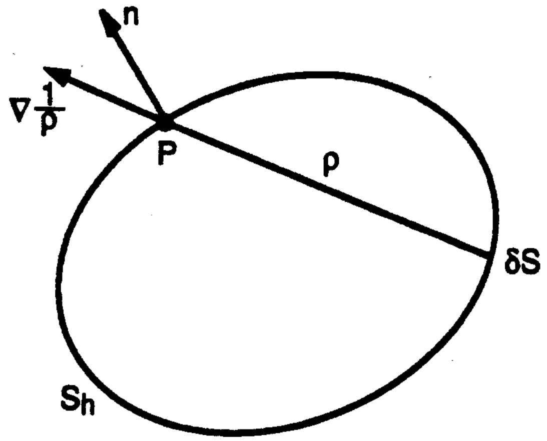
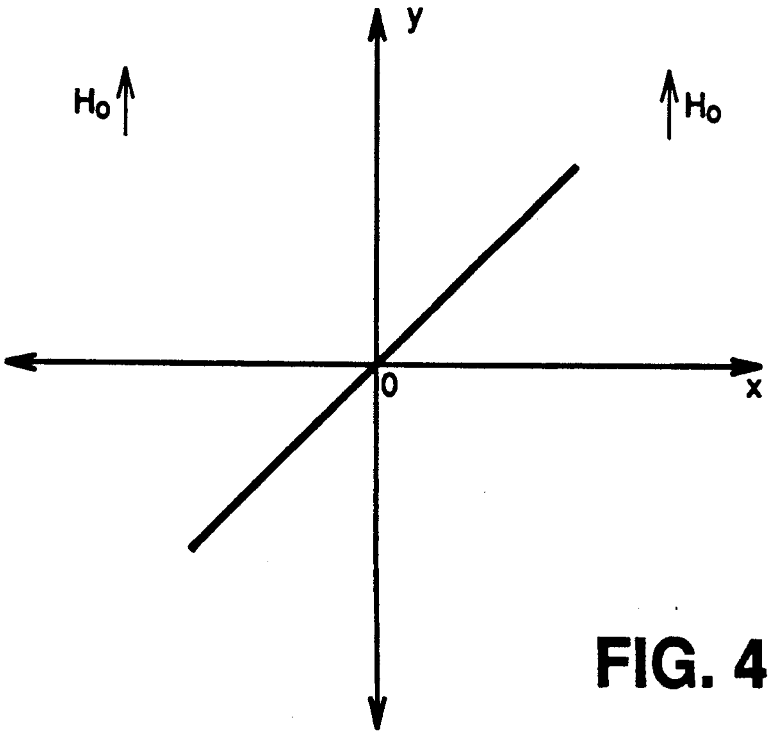
FIG. 4

| $i$ | $\bar{\sigma}_i$ | $i$ | $\bar{\sigma}_i$ |
|---|---|---|---|
| 1 | 0.0504 | 11 | 1.2476 |
| 2 | 0.1516 | 12 | 1.4226 |
| 3 | 0.2541 | 13 | 1.6224 |
| 4 | 0.3585 | 14 | 1.8564 |
| 5 | 0.4659 | 15 | 2.1399 |
| 6 | 0.5771 | 16 | 2.4994 |
| 7 | 0.6936 | 17 | 2.9853 |
| 8 | 0.8168 | 18 | 3.7283 |
| 9 | 0.9484 | 19 | 4.8390 |
| 10 | 1.0910 | 20 | 11.9113 |

FIG. 9
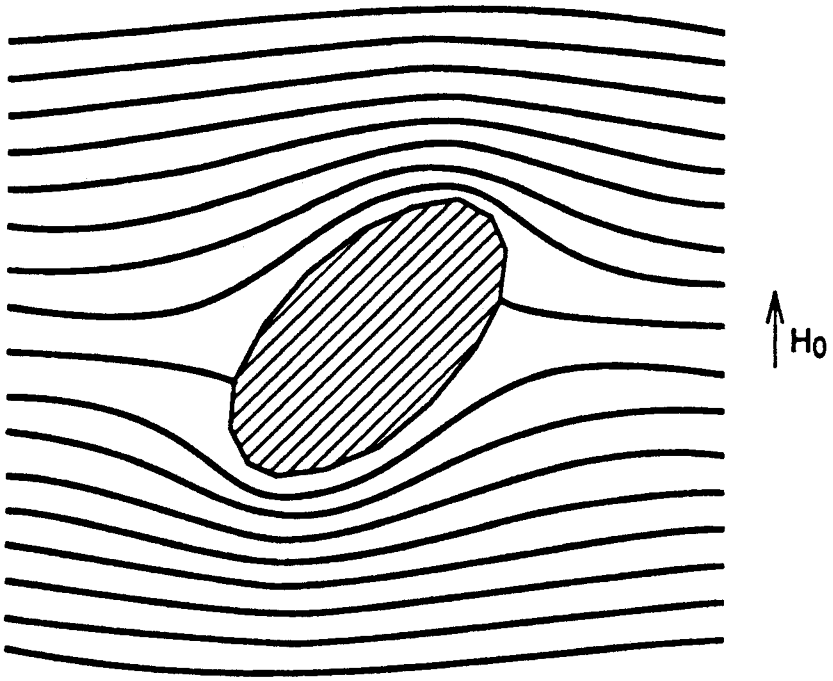
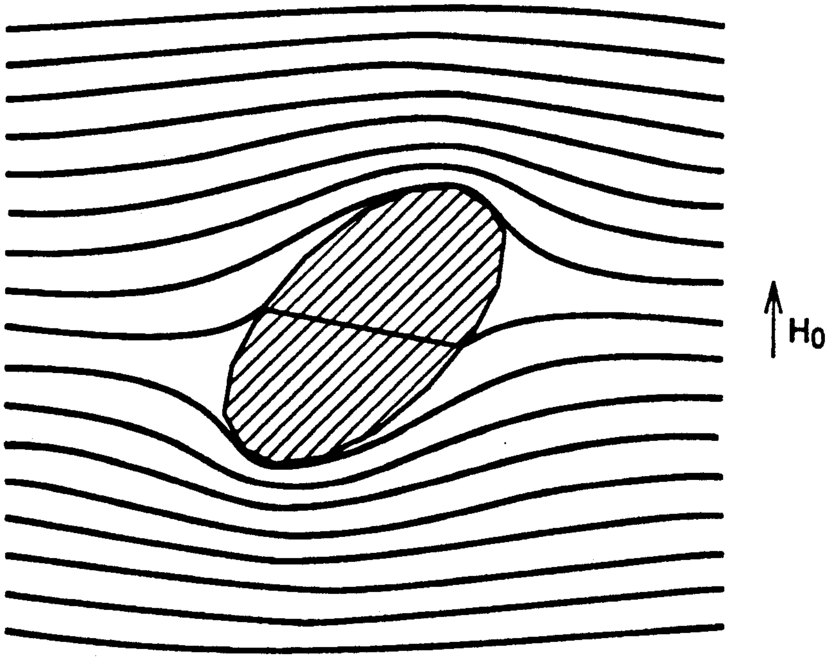
FIG. 10

FIG. 11
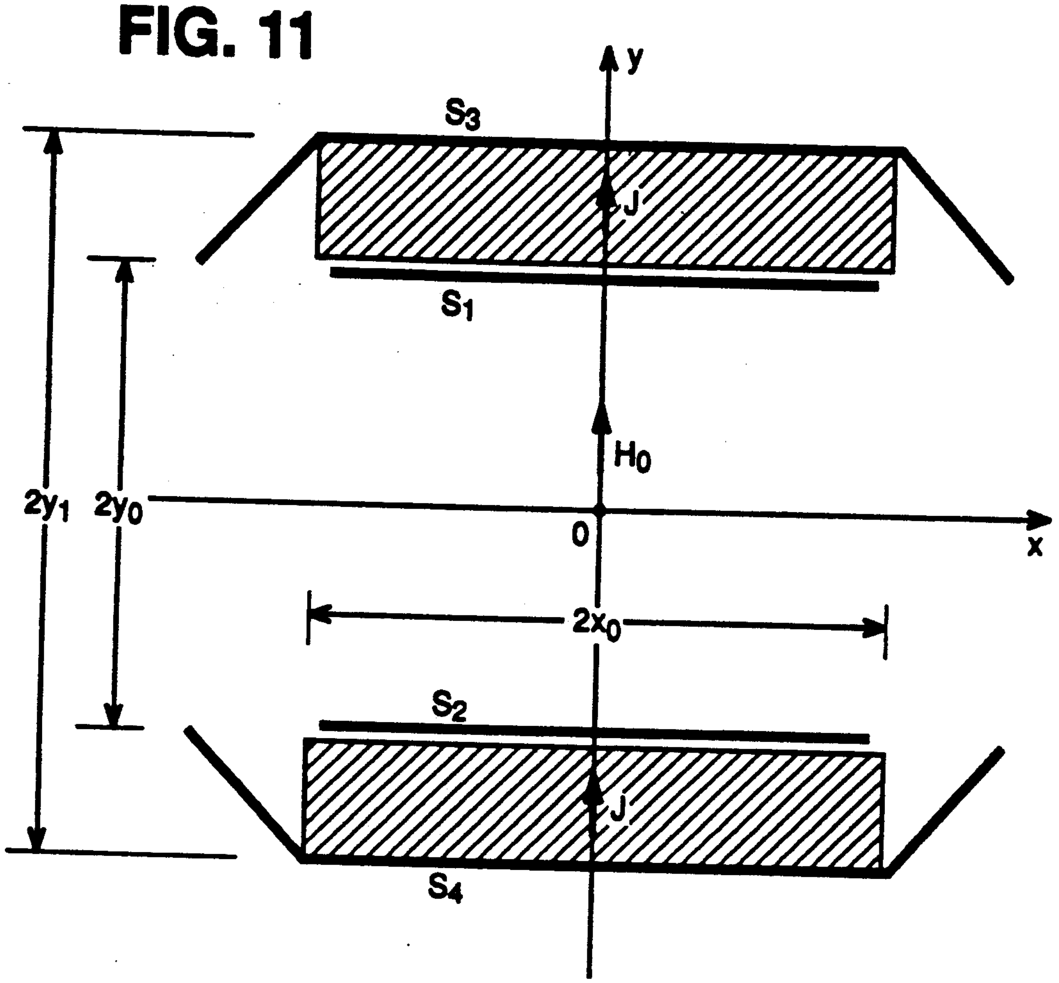
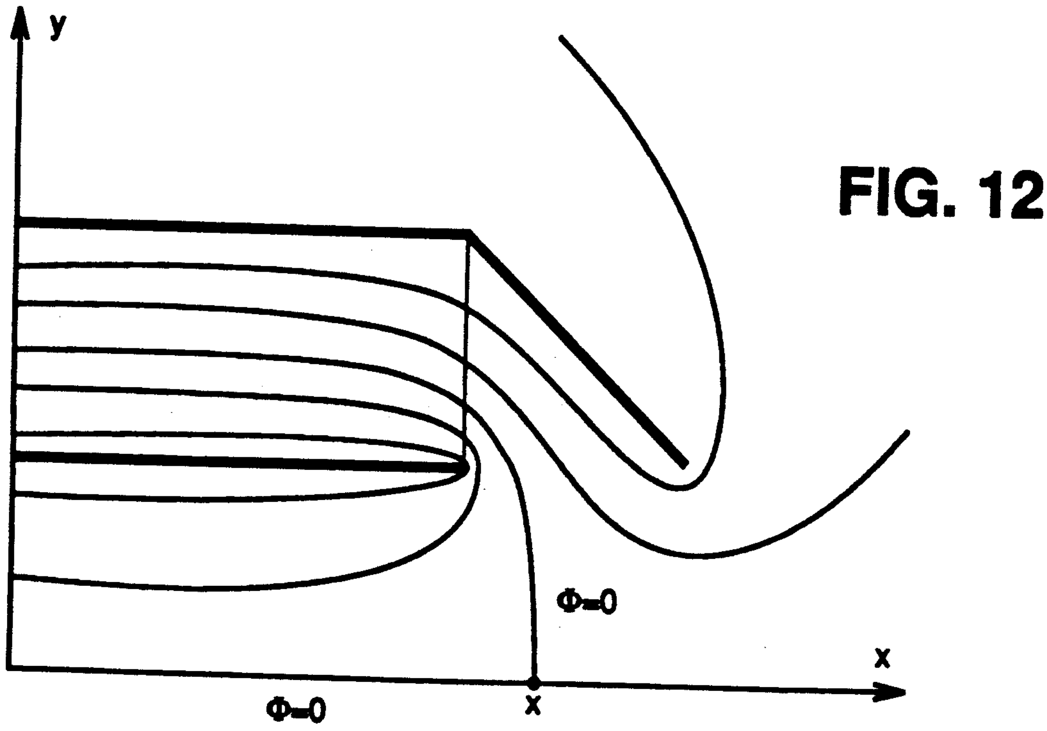
FIG. 12

FIG. 13
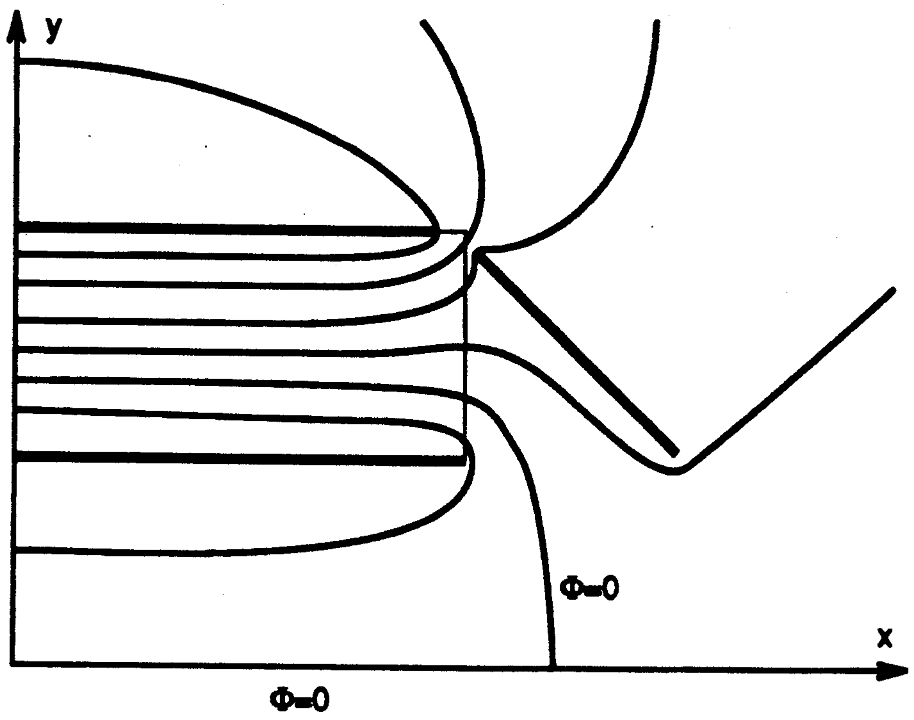
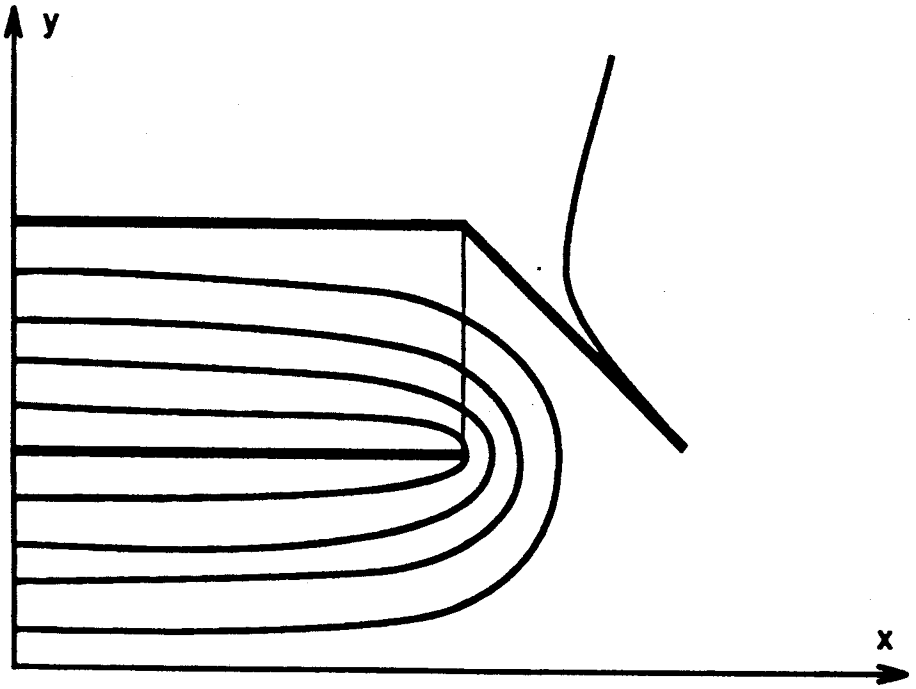
FIG. 14

FIG. 16

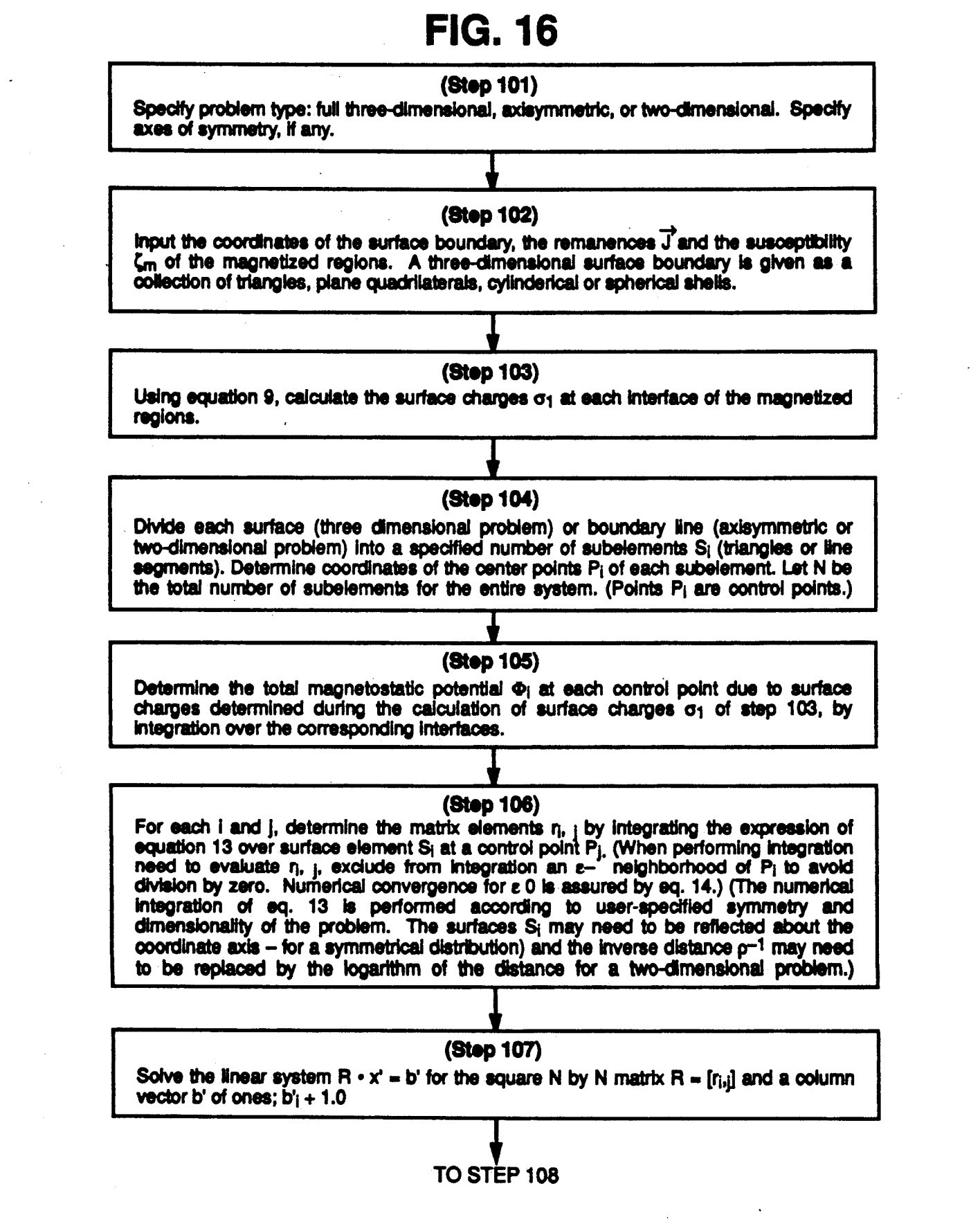

(Step 101)
Specify problem type: full three-dimensional, axisymmetric, or two-dimensional. Specify axes of symmetry, if any.

↓

(Step 102)
Input the coordinates of the surface boundary, the remanences $\vec{J}$ and the susceptibility $\zeta_m$ of the magnetized regions. A three-dimensional surface boundary is given as a collection of triangles, plane quadrilaterals, cylinderical or spherical shells.

↓

(Step 103)
Using equation 9, calculate the surface charges $\sigma_1$ at each interface of the magnetized regions.

↓

(Step 104)
Divide each surface (three dimensional problem) or boundary line (axisymmetric or two-dimensional problem) into a specified number of subelements $S_i$ (triangles or line segments). Determine coordinates of the center points $P_i$ of each subelement. Let N be the total number of subelements for the entire system. (Points $P_i$ are control points.)

↓

(Step 105)
Determine the total magnetostatic potential $\Phi_i$ at each control point due to surface charges determined during the calculation of surface charges $\sigma_1$ of step 103, by integration over the corresponding interfaces.

↓

(Step 106)
For each i and j, determine the matrix elements $r_{i,j}$ by integrating the expression of equation 13 over surface element $S_i$ at a control point $P_j$. (When performing integration need to evaluate $r_{i,j}$, exclude from integration an $\varepsilon-$ neighborhood of $P_i$ to avoid division by zero. Numerical convergence for $\varepsilon$ 0 is assured by eq. 14.) (The numerical integration of eq. 13 is performed according to user-specified symmetry and dimensionality of the problem. The surfaces $S_i$ may need to be reflected about the coordinate axis – for a symmetrical distribution) and the inverse distance $\rho^{-1}$ may need to be replaced by the logarithm of the distance for a two-dimensional problem.)

↓

(Step 107)
Solve the linear system $R \cdot x' = b'$ for the square N by N matrix $R = [r_{i,j}]$ and a column vector b' of ones; $b'_i + 1.0$

↓

TO STEP 108

FIG. 17

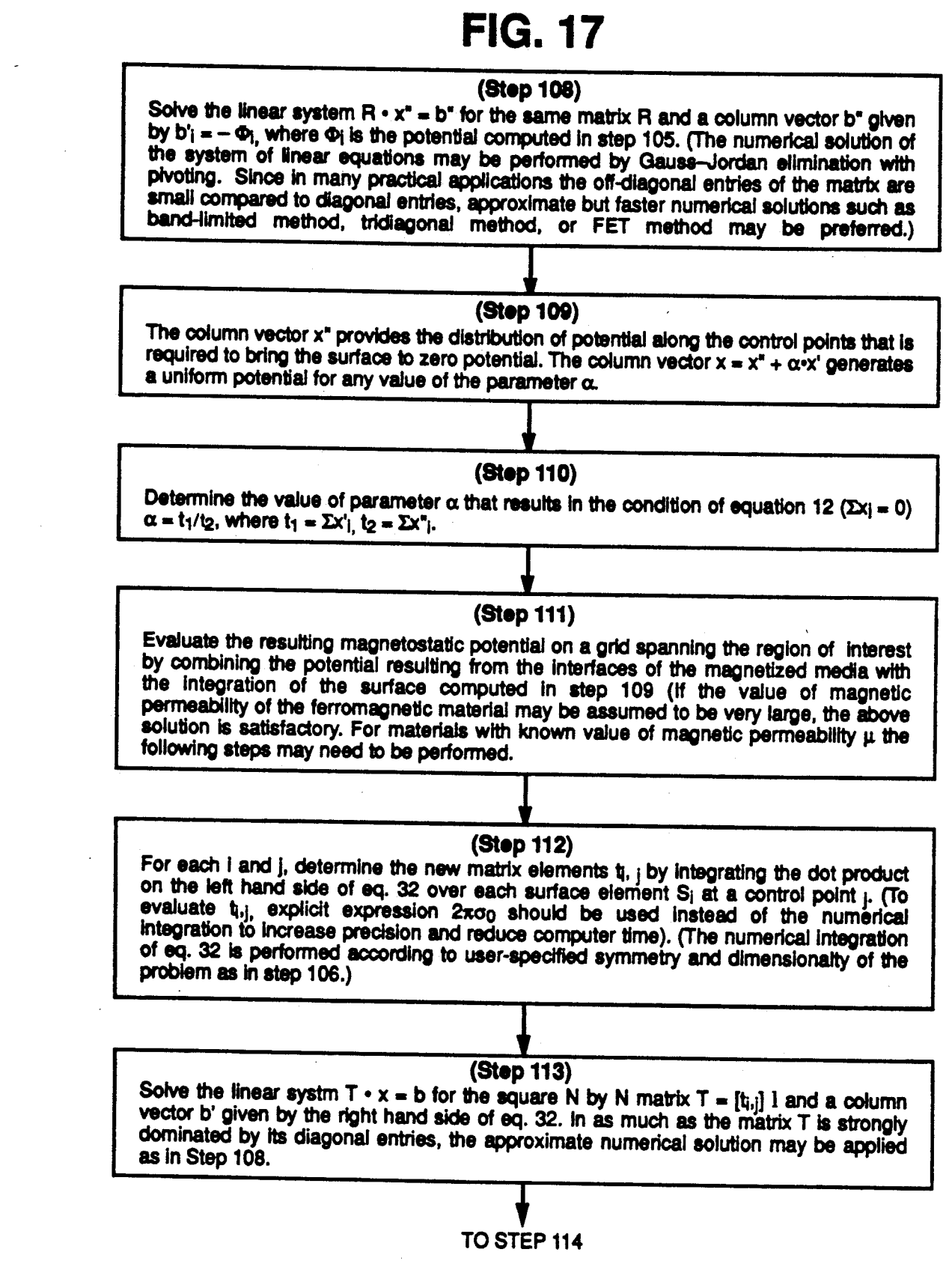

(Step 108)
Solve the linear system $R \cdot x'' = b''$ for the same matrix R and a column vector b" given by $b'_i = -\Phi_i$, where $\Phi_i$ is the potential computed in step 105. (The numerical solution of the system of linear equations may be performed by Gauss–Jordan elimination with pivoting. Since in many practical applications the off-diagonal entries of the matrix are small compared to diagonal entries, approximate but faster numerical solutions such as band-limited method, tridiagonal method, or FET method may be preferred.)

↓

(Step 109)
The column vector x" provides the distribution of potential along the control points that is required to bring the surface to zero potential. The column vector $x = x'' + \alpha \cdot x'$ generates a uniform potential for any value of the parameter $\alpha$.

↓

(Step 110)
Determine the value of parameter $\alpha$ that results in the condition of equation 12 ($\Sigma x_i = 0$) $\alpha = t_1/t_2$, where $t_1 = \Sigma x'_i$, $t_2 = \Sigma x''_i$.

↓

(Step 111)
Evaluate the resulting magnetostatic potential on a grid spanning the region of interest by combining the potential resulting from the interfaces of the magnetized media with the integration of the surface computed in step 109 (if the value of magnetic permeability of the ferromagnetic material may be assumed to be very large, the above solution is satisfactory. For materials with known value of magnetic permeability $\mu$ the following steps may need to be performed.

↓

(Step 112)
For each i and j, determine the new matrix elements $t_{i,j}$ by integrating the dot product on the left hand side of eq. 32 over each surface element $S_i$ at a control point j. (To evaluate $t_{i,j}$, explicit expression $2\pi\sigma_0$ should be used instead of the numerical integration to increase precision and reduce computer time). (The numerical integration of eq. 32 is performed according to user-specified symmetry and dimensionalty of the problem as in step 106.)

↓

(Step 113)
Solve the linear systm $T \cdot x = b$ for the square N by N matrix $T = [t_{i,j}]$ l and a column vector b' given by the right hand side of eq. 32. In as much as the matrix T is strongly dominated by its diagonal entries, the approximate numerical solution may be applied as in Step 108.

↓

TO STEP 114

METHOD FOR DETERMINATION OF OPTIMUM FIELDS OF PERMANENT MAGNET STRUCTURES WITH LINEAR MAGNETIC CHARACTERISTICS

FIELD OF THE INVENTION

This invention relates to an improved method for determining the optimum fields of permanent magnetic structures having linear magnetic characteristics, for enabling the more economical production of magnetic structures.

BACKGROUND OF THE INVENTION

Exact solutions can be achieved in the mathematical analysis of structures of permanent magnets under ideal conditions of linear demagnetization characteristics and for some special geometries and distributions of -magnetization. For instance, an exact mathematical procedure can be followed to design a magnet to generate a uniform field in an arbitrarily assigned polyhedral cavity with perfectly rigid magnetic materials and ideal ferromagnetic materials of infinite permeability.

In general, for arbitrary geometries and real characteristics of magnetic materials, only approximate numerical methods can be used to compute the field generated by a permanent magnet. The capability of handling systems of a large number of equations with modern computers has led to the development of powerful numerical tools such as the finite element methods, in which the domain of integration is divided in a large number of cells. By selecting a sufficiently small cell size, the variation of the field within each cell can be reduced to any desired level. Thus the integration of the Laplace's equation in each cell can be reduced to the dominant terms of a power series expansion and the constants of integration are determined by the boundary conditions at the interfaces between the cells. An iteration procedure is usually followed to solve the system of equations of the boundary conditions and the number of iterations depends on the required numerical precision of the result.

In applications where the field within the region of interest must be determined with extremely high precision, the large number of iterations may become a limiting factor in the use of these numerical methods. It is beyond the scope of this disclosure to provide a detailed explanation of past techniques for this purpose.

A special situation is encountered in magnetic structures that make use of the rare earth permanent magnets that exhibit quasi linear demagnetization characteristics with values of the magnetic susceptibility small compared to unity. A magnetic structure composed of these materials and ferromagnetic media of high magnetic permeability can be analyzed with a mathematical procedure based on a perturbation of the solution obtained in the limit of zero susceptibility and infinite permeability.

Structures composed of ideal materials of linear magnetic characteristics present a special situation where an exact solution is formulated by computing the field generated by volume and surface charges induced by the distribution of magnetization at the boundaries or interfaces between the different materials.

SUMMARY OF THE INVENTION

The determination of the field in this ideal limit can be developed with a boundary solution method which may be formulated in a way that substantially reduces the number of variables as compared to the finite element method. The invention is therefore directed to a method for determining the fields of permanent magnet structures with a surface or boundary solution method for the magnetic material with linear characteristics with small susceptibility and large permeabilities of the ferromagnetic materials.

BRIEF DESCRIPTION OF THE DRAWING

In order that the invention may be more clearly understood, it will now be disclosed in greater detail with reference to the accompanying drawing, wherein:

FIG. 3 illustrates one of the surfaces of FIG. 2;

FIG. 4 illustrates a strip of infinite permeability in a uniform magnetic field;

FIG. 9 illustrates an equilateral hexadecagon at 45° with respect to a uniform field. In this figure the magnetic permeability of the material is infinite;

FIG. 10 illustrates the polyhedron of FIG. 9 assuming $\mu_0/\mu=0.5$;

FIG. 11 illustrates a structure of uniformly magnetized material and zero-thickness plates;

FIG. 12 illustrates the field configuration of the structure of FIG. 11;

FIG. 13 illustrates the field configuration corresponding to the separation of inclined sides;

FIG. 14 illustrates the field configuration within the structure under the condition $\Phi_3=\Phi_4=0$;

FIGS. 16–18 constitute a flow diagram of the method of the invention.

DETAILED DISCLOSURE OF THE INVENTION

Field of structure for ideal materials with susceptibility vm=0 and $\mu=\infty$.

Figure 1:
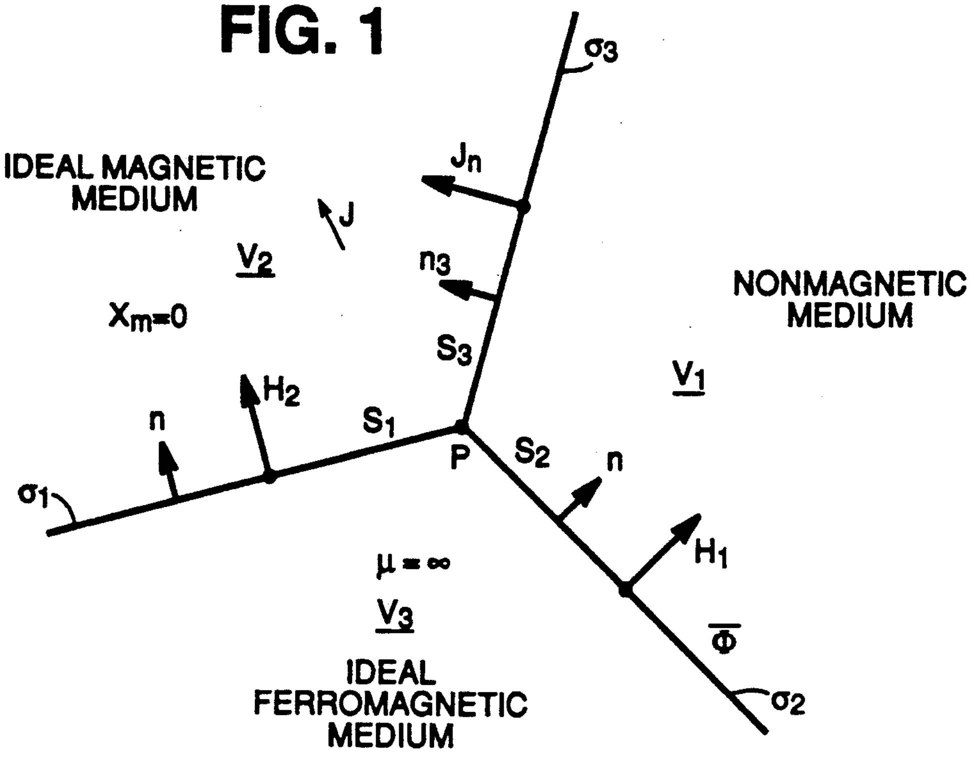
FIG. 1 illustrates the magnetic conditions at the interfaces of three media.

Consider the structure of FIG. 1 composed of three media: a nonmagnetic medium in region $V_1$, an ideal magnetic medium of zero magnetic susceptibility ($\chi_m=0$) in region $V_2$, and an ideal ferromagnetic medium of infinite magnetic permeability $\mu$ in region $V_3$. This figure represents the most general interface and defines a basic boundary condition.

Because of the assumption $\mu=\infty$, the region $V_3$ is equipotential and so are the interfaces $S_1$, $S_2$ between the region $V_3$ and the two regions $V_1$ and $V_2$. Thus, at each point of interfaces $S_1$, $S_2$ the intensities $\vec{H}_1$, $\vec{H}_2$ of the magnetic field computed in regions $V_1$ and $V_2$ are perpendicular to the interfaces, as indicated in FIG. 1.

Assume a unit vector $\vec{n}$ perpendicular to the boundary surface of region $V_3$ and oriented outward with respect to $V_3$. The intensity of the magnetic field induces a surface charge $\sigma$ on interfaces $S_1$, $S_2$ given by $$\sigma=\mu_0\vec{H}\cdot\vec{n} \quad (1)$$

On the interface $S_3$ between the region $V_1$ of nonmagnetic material and the region $V_2$ of magnetic medium, the surface charge density $\sigma_3$ is given by $$\sigma_3=\mu_0(\vec{H}_2-\vec{H}_1)\cdot\vec{n}_3 \quad (2)$$

where the unit vector $\vec{n}_3$ is perpendicular to $S_3$ and oriented from region $V_1$ to region $V_2$. The magnetic induction $\vec{B}_1$ in the region $V_1$ is $$\vec{B}_1=\mu_0\vec{H}_1 \quad (3)$$

and the magnetic induction $\vec{B}_2$ in the region $V_2$ of zero magnetic susceptibility is $$\vec{B}_2=\vec{J}+\mu_0\vec{H}_2 \quad (4)$$

where $\vec{J}$ is the remanence of region $V_2$. On interface $S_3$ vectors $\vec{B}_1$, $\vec{B}_2$ satisfy the condition $$(\vec{B}_2-\vec{B}_1)\cdot\vec{n}_3=0 \quad (5)$$

Thus eq. (2) reduces to $$\sigma_3=-\vec{J}\cdot\vec{n}_3 \quad (6)$$

In general, a singularity of the intensity $\vec{H}$ occurs at the intersection P of the interfaces unless the geometry of the interfaces and the surface charge densities satisfy the condition $$\Sigma\sigma_h\vec{\tau}_h=0 \quad (7)$$

where h are integers and $\vec{\tau}_h$ are the unit vectors tangent to the interfaces at point P and oriented in the direction pointing away from the interfaces.

Figure 2:
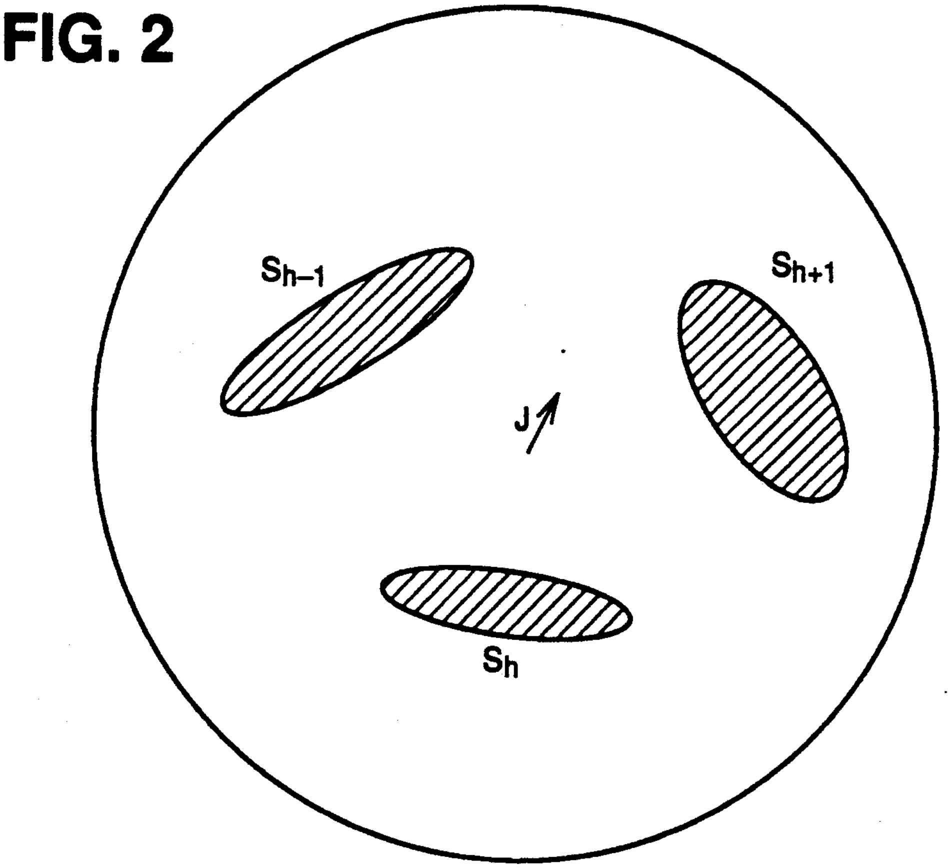
FIG. 2 defines the most general configuration of the magnetic media.

Assume a number N of surfaces $S_h$ of $\mu=\infty$ media as shown in FIG. 2. This figure illustrates the most general configuration with arbitrary distribution of remanence J. The region is limited by plural regions S enclosing media of given $\mu$. The boundary $S_0$ limits the region of interest. FIG. 3 illustrates an arbitrary one of the surfaces of FIG. 2, in greater detail. The external region surrounding the N surfaces is a medium of zero magnetic susceptibility with an arbitrary distribution of remanences $\vec{J}$, which is equivalent to a volume charge density $$\nu=-\nabla\vec{J} \quad (8)$$

In the particular case of a uniform magnetization of the external region, the vector $\vec{J}$ is solenoidal and the distribution of magnetization reduces to surface charges $\sigma_i$ on the interfaces between the regions of remanemces $\vec{J}_{i-1}$ and $\vec{J}_i$ $$\sigma_i=(\vec{J}_{i-1}-\vec{J}_i)\cdot\vec{n}_i \quad (9)$$

where $n_i$ is the unit vector perpendicular to the interface and oriented from the region of remanence $\vec{J}_{i-1}$ to the region of remanence $\vec{J}_i$. Eq. (7) is a particular case of eq. (9).

At each point P of the structure of FIG. 2 the scalar magnetostatic potential is $$\Phi(P) = -\frac{1}{4\pi\mu_0}\left[-\int_V \frac{\nabla\cdot\vec{J}}{\nabla}dV + \sum_{i=1}^{N}\int\frac{\sigma_i}{\rho_i}dS\right] \quad (10)$$

where V is the volume of the external region, $\sigma_i$ is the surface charge density induced by $\vec{J}$ at a point of $S_i$, $\sigma$ is the distance of point P from a point of volume V, and $\sigma_i$ is the distance of P from a point of surface $S_i$. In the limit $\mu=\infty$ the surface charge densities $\sigma_i$ in eq. (10) are determined by the boundary conditions $$\Phi(P_h)=\Phi_h \quad (11)$$

where $P_h$ is a point of surface $S_h$ and $\Phi_h$ is the potential of surface $S_h$. Equation (11) is an identity that must be satisfied at all points of $S_h$.

Equations of the type of equations (10) and (11) may be employed in the determination of the magnetic fields of permanent magnetic structures, using a volumetric analysis. This approach, however requires extensive calculations, especially when complex structures are to be analyzed. In accordance with the present invention, as will now be discussed, much simpler and less time consuming calculations may be made employing surface analysis, to thereby reduce the effort required for the production of a magnetic structure having desired characteristics.

By definition, each surface $S_h$ immersed in the magnetic field generated by $\vec{J}$ cannot acquire a non zero magnetic charge. Thus the distribution of surface charges $\sigma$ on each surface $S_h$ must satisfy the condition $$\int_{S_h}\sigma_h dS = 0 \quad (12)$$

Thus, by virtue of eqs. (10) and (11), the unknown quantities $\sigma_i$, $\Phi_h$ are the solution of the system of equations (12) and the identities $$\sum_{i=1}^{N}\int_{S_i}\frac{\sigma_h}{\rho_{h,i}}dS - 4\pi\mu_0\Phi_h = \int\frac{\nabla\cdot\vec{J}}{\rho_h}dV,\ h = 1, 2, \ldots N \quad (13)$$

where $\rho_h$ is the distance of a point P of surface $S_h$ from a point of volume V, and $\rho_{h,i}$ is the distance of P from a point of surface $S_i$. For i=h, $\rho_{h,i}$ is the distance between two points of surface $Sh_h$.

In eq. (13) the independent variables $\Phi_h$ are the potentials of surfaces $S_h$ relative to a common arbitrary potential of a surface $S_0$ that encloses the structure of FIG. 2. In particular $S_0$ may be located at infinity.

In eq. (13) $\rho_{i,h}$ is zero for the element of charge located at the point where the scalar potential is computed. However, as long as $\sigma_i$ is finite, the integral of the left-hand side of eq. (13) does not exhibit a singularity. Consider a circle of small radius r on surface $S_i$ with the center at a point P. For $r\rightarrow 0$, the contribution of the surface charge $\sigma_i$ within the circle of radius r to the potential at P is $$\lim_{r=0}\int\frac{\sigma_i}{\rho_i}dS = 2\pi\sigma_i(P)\lim_{r\rightarrow 0}\int_0^r dr = 0 \quad (14)$$

Magnets with Linear Characteristics of Magnetic Media and Arbitrary Ferromagnetic Materials Eqs. (12) and (13) are based on the assumption of ideal materials characterized by $\chi_m=0$ and $\mu=\infty$. Assume now that the magnetic material has a linear demagnetization characteristic with a non zero value of the magnetic susceptibility $\chi_m$ $$\chi_m << 1 \quad (15)$$

Assume also a linear characteristic of the ferromagnetic material with a magnetic permeability such that $$\frac{\mu_0}{\mu} << 1 \quad (16)$$

The magnetic induction in the region of the magnetized material is $$\vec{B}=\vec{J}+\mu_0(1+\chi_m)\vec{H} \quad (17)$$

The solution of the field equation within the magnetized material can be written in the form $$\vec{B}=\vec{B}_0+\delta\vec{B}, \vec{H}=\vec{H}_0+\delta\vec{H} \quad (18)$$

where $\vec{B}_0$, $\vec{H}_0$ are the magnetic induction and the intensity of the magnetic field in the limit $\chi_m=0$. By virtue of eq. (15) one can assume $$|\delta\vec{B}|<<|\vec{B}|, |\delta\vec{H}|<<|\vec{H}_0| \quad (19)$$

By neglecting higher order terms, eq. (17) yields $$\delta\vec{B}=\mu_0\chi_m\vec{H}_0+\mu_0\delta\vec{H} \quad (20)$$

i.e., $\delta\vec{B}$ and $\delta\vec{H}$ are related to each other as if the magnetic material was perfectly transparent ($\chi_m=0$) and magnetized with a remanence $$\delta\vec{J}=\mu_0\chi_m\vec{H}_0 \quad (21)$$

Thus, the first order perturbation $\delta\Phi$ of the scalar potential is a solution of the equation $$\delta^2(\delta\Phi)=-\delta\cdot(\chi_m\vec{H}_0)=-\vec{H}_0\cdot\delta\chi_m-\chi_m\delta\cdot\vec{J} \quad (22)$$

Assume that the magnetic structure is limited by surfaces $S_h$ of infinite magnetic permeability materials. By virtue of eqs. (13) and (22), the first order perturbation $\delta\Phi$ and $\delta\sigma_h$ of the potential and surface charge density on these surfaces are the solution of the identities $$\sum_{i=1}^{N}\int\frac{\delta\sigma_i}{\rho_{i,h}}dS-4\pi\mu_0\delta\Phi_h=\mu_0\int\frac{\nabla\cdot(\chi_m\vec{H}_0)}{\rho_h}dV \quad (23)$$

and the equations $$\int\delta\sigma_h\,dS=0, (h=1, 2, \ldots N) \quad (24)$$

In the limit 16, the finite magnetic permeability of the ferromagnetic materials inside surfaces $S_h$ results in an additional perturbation of the potential in the magnetic structure and in a non zero magnetic field inside surfaces $S_h$. At each point of $S_h$, the intensities $\vec{H}_e$ and $\vec{H}_i$ of the magnetic field outside and inside the ferromagnetic material satisfy the boundary condition $$\left(\vec{H}_e-\frac{\mu}{\mu}\vec{H}_i\right)\cdot\vec{n}=0 \quad (25)$$

where $\vec{n}$ is a unit vector perpendicular to $S_h$ and oriented outwards with respect to the ferromagnetic material.

$\vec{H}_e$ and $\vec{H}_i$ are the intensities at two points $P_e$, $P_i$ at an infinitismal distance from P within the regions outside and inside $S_h$ respectively.

The boundary conditions on surface $S_h$ will be satisfied by replacing the medium of permeability $\mu$ with a surface charge distribution $\sigma$ on $S_h$ and by assuming that:

$$\mu=\mu_0 \quad (26)$$

everywhere. At points $P_e$, $P_i$ the intensity generated by an element of charge $\sigma d\sigma$ at P is perpendicular to $S_h$ and is given by:

$$\vec{H}=\pm\frac{\sigma(P)}{2\mu_0}\vec{n} \quad (27)$$

at $P_e$ and $P_i$ respectively. Thus the normal components of $\vec{H}_e$, $\vec{H}_i$ suffer a discontinuity at P given by:

$$(\vec{H}_e-\vec{H}_i)\cdot\vec{n}=2H=\frac{\sigma(P)}{\mu_0} \quad (28)$$

and because of equation 55 the charge $\sigma(P)$ satisfies the equation $$\left(1-\frac{\mu_0}{\mu}\right)\vec{H}_e\cdot\vec{n}=\frac{\sigma(P)}{\mu_0} \quad (29)$$

Hence, by virtue of 7.6.31, the normal component of $\vec{H}_e$ satisfies the boundary condition:

$$\frac{\sigma(P)}{2\mu_0}-\frac{1}{2\pi\mu_0}\int\sigma\nabla_P\left(\frac{1}{\rho}\right)\cdot\vec{n}dS_h=\frac{m}{4\pi\mu_0}\nabla_P\left(\frac{1}{\rho}\right)\cdot\vec{n} \quad (30)$$
$$=H_e\cdot n$$

at each point P of $S_h$. The second term on the left hand side of equation 30 is the normal component of the intensity generated at P by the surface charge density $\sigma$. The symbol $\rho$ denotes the distance of P from a point of S and the point Q whose charge m is located. As indicated in FIG. 3, the gradients of $\rho^{-1}$ are computed at point P. By virtue of equation 25, equation 30 transforms into the boundary equation $$\left(1-\frac{2}{1-\frac{\mu_0}{\mu}}\right)\sigma(P)- \quad (31)$$

$$\frac{1}{2\pi}\int_{S_h}\sigma\nabla_P\left(\frac{1}{\rho}\right)\cdot ndS_h=\frac{m}{2\pi}\nabla_P\left(\frac{1}{\rho}\right)\cdot\vec{n}$$

The integration of each term of equation 31 over the closed surface $S_h$ yields:

$$\frac{1}{2\pi}\int_{S_h}\sigma\left[\int_{S_h}\nabla_p\left(\frac{1}{\rho}\right)\cdot n dS\right]dS_n=-\int\sigma dS_h \quad (32)$$

and $$\frac{m}{2\pi}\int\nabla_p\left(\frac{1}{\rho}\right)\cdot\vec{n}dSh=-\frac{m}{2\pi}\Omega(Q) \quad (33)$$

where $\Omega$)Q) is the solid angle of view of the closed surface $S_h$ from the point Q where charge m is located. If point Q is outside of $S_2$, then $$\Omega(Q)=0 \quad (34)$$

Hence, by virtue of equations 32, 33 and 34, the integration of equation 61 over $S_h$ yields:

$$\int_{S_h}\sigma dS=0 \quad (35)$$

which reflects the fact that the material of permeability $\mu$ immersed in the magnetic field generated by external sources is going to be polarized by the field, but it cannot acquire a non-zero magnetic charge.

In the limit $\mu=\infty$, $S_h$ becomes an equipotential surface at a potential $\Phi_h$, whose value is determined by the solution of boundary equation 31. At each point P of $S_h$, $\Phi_h$ is the sum of the potential generated by the charge distribution $\sigma$ and by point charges m in a uniform medium of permeability $\mu_0$. Thus, $\Phi_h$ must satisfy the equation:

$$\int_{S_h}\frac{\sigma}{\rho}dS_h-4\pi\mu_0\Phi_h=-\frac{m}{\rho} \quad (36)$$

where $\sigma$ is given by the solution of equation 31. Since equation 35 is the direct consequence of equation 31, in the limit $\Phi\rightarrow\infty$ the variables $\sigma$ and $\Phi_h$ can be determined by the solution of the system of equations 35 and 36.

In the integral on the left hand side of equation 36, the distance $\rho$ is zero for the element of charge $\sigma adS_h$ located at the point where the potential is computed. However, as long as $\sigma$ is finite, the integral does not exhibit a singularity. Consider a circle on surface $S_h$ of small radius and with center at P. For $r\rightarrow0$, the potential due to the surface charge within the area $\pi r^2$ is $$\frac{1}{4\pi\mu_0}\lim_{T\rightarrow0}\int\frac{\sigma}{r}dS=\frac{\sigma(P)}{2\mu_0}\lim_{r\rightarrow0}\int_0^r dr=0 \quad (37)$$

A ferromagnetic material is characterized by a large value of its permeability. In the limit:

$$\frac{\mu_0}{\mu}<<1 \quad (38)$$

The normal component of $\vec{H}_e$ on the surface $S_h$ may be written in the form:

$$H_{en}\sim H_{e0}\left(1-G\frac{\mu_0}{\mu}\right) \quad (39)$$

where $H_{eo}$ is the field intensity in the limit $\mu=\infty$ and factor G is a numerical factor that depends upon the geometry of $S_h$. The G is a function of the position of the point P. By virtue of equations 29 and 30, the surface charge density $\sigma$(P) may be written in the form:

$$\sigma(P)=\sigma_\infty(P)+d\sigma \quad (40)$$

where $\sigma_\infty$ is the solution of equation 31 in the limit $\mu=\infty$. By virtue of equation 39, $$\sigma_\infty=\mu_0H_{e0} \quad (41)$$

Thus equation 40 yields:

$$d\sigma\approx(1+G)\frac{\mu_0}{\mu}\sigma_\infty \quad (42)$$

By substituting the value of $\sigma$ given by equation 40 in equation 31:

$$d\sigma(P)+\frac{1}{2\pi}\int d\sigma\nabla\left(\frac{1}{\rho}\right)\cdot\vec{n}dS_h=-2\frac{\mu_0}{\mu}\sigma_\infty(P) \quad (43)$$

and by virtue of equation 42, function G satisfies the equation $$G(P)-1+\frac{1}{2\pi\sigma_\infty(P)}\int(1+G)\sigma_\infty\nabla_p\left(\frac{1}{\rho}\right)\vec{n}dS_h=0 \quad (44)$$

Once the value of $d\sigma$ has been obtained by solving equation 43, the potential $d\mu$ generated inside surface $S_h$ can be computed:

$$d\Phi\sim\frac{1}{4\pi\mu_0}\int\frac{d\sigma}{\rho}dS_h=-\frac{1}{4\pi\mu}\int\frac{(1+G)}{\rho}\sigma_\infty dS_h \quad (45)$$

Thus, the magnetic induction $\vec{B}$ inside $S_h$ is $$\vec{B}=\frac{1}{4\pi}\int_{S_h}(1+G)\sigma_\infty\nabla_p\left(\frac{1}{\rho}\right)dS_h \quad (46)$$

i.e. in the limit of equation 38, the magnetic induction inside $S_h$ is independent of $\mu$ and is determined only by the distribution of $\sigma_\infty$ and the geometry of $S_h$.

In some particular case G is independent of the position of P, in which case $d\sigma$ is proportional to $\sigma_\infty$, and the field generated by $d\sigma$, i.e. the external field in the absence of the medium of permeability $\mu$.

As an example consider a cylinder of radius $r_0$ and permeability $\mu$ immersed in a uniform field of intensity $H_0$ perpendicular to the axis of the cylinder. Assume the polar coordinate system (r,$\Theta$), where r is the distance from the axis of the cylinder and $\Theta$ is the angle between r and the direction of $\vec{H}_0$. The radial component of the magnetic field is $$
\begin{cases} H_{re} = H_0\left[1 + \frac{\mu - \mu_0}{\mu + \mu_0} \frac{r_0^2}{r^2}\right]\cos\theta & r > r_0 \\ H_{ri} = \mu_0 \frac{2H_0}{\mu + \mu_0} \cos\theta & r < r_0 \end{cases} \quad (47)
$$

and the surface charge density $\sigma$ is $$
\sigma = \mu_0[H_{re} - H_{ri}]_{r=r_0} = 2\mu_0 H_0 \frac{\mu - \mu_0}{\mu + \mu_0}\cos\theta \quad (48)
$$

Thus in the limit (27)

$$
\sigma_0 = 2\,\mu_0 H_0 \cos\Theta \quad (49)
$$

and $$
\delta\sigma \approx -\frac{2\mu_0}{\mu}\sigma_0 \quad (50)
$$

Thus the intensity $\delta\vec{H}$ of the field inside the ferromagnetic material is $$
\delta\vec{H} \approx \frac{2\mu_0}{\mu}\vec{H_0} \quad (51)
$$

Numerical Solution

With the exception of some elementary geometries and distribution of magnetization like, for instance, a structure of concentric cylindrical or spherical layers of uniformly magnetized media and uniform materials, eqs. (12) and (13) cannot be solved in closed form, requiring numerical integration. This is accomplished by replacing in eqs. (12) and (13) the integrals with sums over small elements of surfaces of the ferromagnetic materials and the volume of the magnetized material. Thus, eqs. (12) and (13) transform to $$
\sum_m \sigma_{hm}\,\delta S_{hm} = 0 \quad (52)
$$

$$
\sum_{i,m} \frac{\sigma_{im}}{\rho_{him}}\delta S_{ini} - 4\pi\mu_0\Phi_h = \sigma_m \frac{\overline{(\nabla\cdot\vec{J})_n}}{\rho_{h,n}}\delta V_n \quad (53)
$$

$$
(h = 1, 2, \ldots N)
$$

where $\overline{\sigma}_{im}$ is the average value of the surface charge density in the element of surface $\delta V_n$. and $\overline{(v\cdot J)_n}$ is the average value of the divergence of $\vec{J}$ in the element of volume $\delta V_n$. The value $\rho_{h,n}$ is the distance between the center of an element of surface $\delta S_h$ and the center of the element of volume $\delta V_m$. The value $\rho_{him}$ is the distance between the centers of elements of surface $\delta S_h$ and $\delta S_{im}$. The value $\Phi_h$ is the potential computed at the center of each element of surface $\delta S_h$. Thus in the approximation of eqs. (39) and (40), the condition of constant potential is imposed only at a number of selected points equal to the number of surface elements. The potential is allowed to fluctuate between these points about the average values $\Phi_h$. The amplitude of the fluctuations decreases as the dimensions of the elements of the surface decrease.

As an example, apply eqs. (39) and (40) to the computation of the field in the two-dimensional problem of a strip of infinite magnetic permeability located in a uniform field as shown in FIG. 4, where the axis z coincides with the center of the strip. Assume that the uniform field is oriented in the positive direction of the axis y. If the potential is assumed to be zero on the plane y=0, the scalar potential of the uniform field is $$
\Phi = -H_0 y, \quad (54)
$$

where the positive constant $H_0$ is the intensity of the field. Because of symmetry, the potential of the strip must be equal to the value of the potential on the plane y=0, independent of the angle between the field and the plane of the strip. Thus in eq. (40)

$$
\Phi_h = 0 \quad (55)
$$

The right hand side of eq. (40) corresponds to the potential at each point of the strip due to an external distribution of magnetization that generates the uniform field. Thus eq. (40) reduces to $$
\sum_m \frac{\sigma_m}{\rho_m}\delta S_m = -4\pi\mu_0 H_0 y \quad (56)
$$

where $\rho$ is the distance of the m-th element of surface $\delta S_m$ and a point P of the strip, and y is the ordinate of P.

The left hand side of eq. (43) can be readily integrated along the z coordinate. For a strip of infinite length, each element of surface of an infinitely long strip of infinitesimal width $d\zeta$ generates a potential $d\Phi$ at a point P of the strip $$
d\Phi = -\frac{\sigma(\zeta)d\zeta}{2\pi\mu_0}\ln r + \overline{\Phi} \quad (57)
$$

where $\overline{\Phi}$ is an arbitrary constant and r is the absolute value of the distance of P from the strip of width $d\zeta$:

$$
r = |\zeta - \tau| \quad (58)
$$

where $\zeta$ and $\tau$ are the distances of $d\zeta$ and P from the center of the strip.

The numerical solution of eqs. (39) and (43) proceeds by dividing the width $2\tau_0$ of the strip in 2n equal intervals and by computing the left hand side of eq. (43) at the center of each interval. By virtue of eq. (28), if the number 2n of intervals is sufficiently large, one can neglect in each interval the contribution of the charges within the same interval.

Because of symmetry, the surface charge density satisfies the condition $$
\sigma(-y) = -\sigma(y) \quad (59)
$$

Thus eq. (39) is automatically satisfied and the values of $\sigma(y)$ are the solutions of the system of n equations in the n variables $\overline{\sigma}_m$ $$
\sum_{m=1}^{n} a_{h,m}\overline{\sigma}_m = (2h - 1)H_0\cos\alpha, \quad (60)
$$

$$
h = 1, 2, \ldots n
$$

where coefficients $a_{h,m}$ are $$
a_{h,m} = \frac{1}{2\pi\mu_0}[-[2|h - m| + 1]\ln[2|h - m| + 1] + \quad (61)
$$

-continued $$[2|h-m|-1]\ln[2|h-m|-1]-$$
$$[2|h+m|-3]\ln[2|h+m|-3]+$$
$$[2|h+m|-1]\ln[2|h+m|-1]]$$

for h≠m and $$a_{m,m} = \frac{1}{\pi\mu_0}[1+\ln 2n] \quad (62)$$

for h=m. In eqs. (47) $\bar{\sigma}_m$ is the average value of $\sigma$ in the interval where the center has the coordinates $$x_m = (2m-1)\frac{r_0}{2n}\sin\alpha, \quad y_m = (2m-1)\frac{r_0}{2n}\cos\alpha \quad (63)$$

If $\alpha=\pi/2$, i.e., if the external field is perpendicular to the strip, the solution of eq. (47) is $$\sigma_m = 0 \quad (64)$$

for all values of m and no distortion of the field is generated by the strip. Thus the non zero value of $\sigma_m$ is determined only by the field component parallel to the strip.

Figures 5, 6:
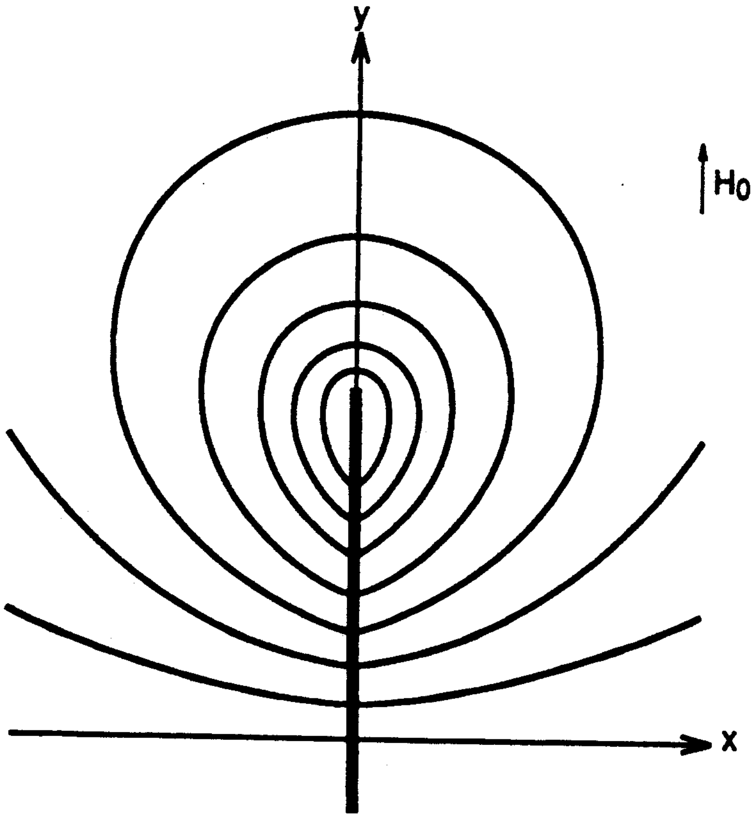
FIG. 5 is a table showing the distribution of surface charges along the strip for n=20.
FIG. 6 show a plot of equipotential lines generated by the strip.

FIG. 5 shows the solution of the system of eqs. (47) for n=20. The plotting of the equipotential lines generated by the charge distribution of the strip is shown in FIG. 6. As expected, for $\Phi\rightarrow 0$, the equipotential lines become circles that pass through the origin of the coordinates and with center located on the line $$y = \frac{x}{\tan\alpha} \quad (65)$$

Figure 7:
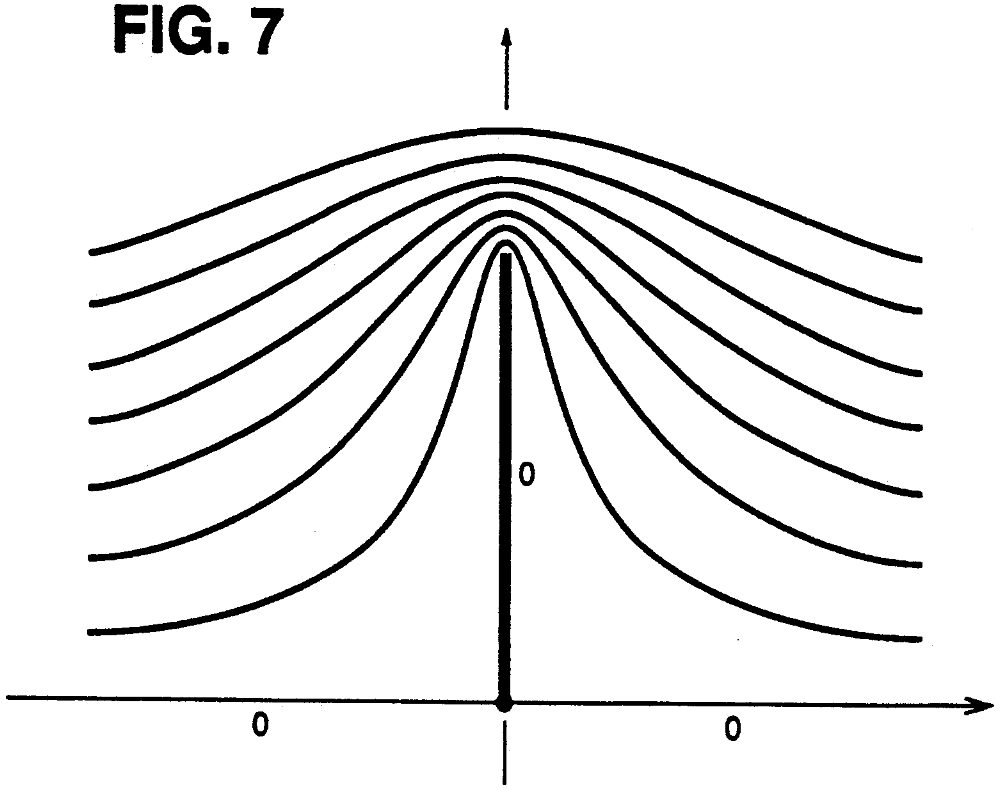
FIG. 7 shows the equipotential lines when the angle $\alpha=0$.
Figure 8:
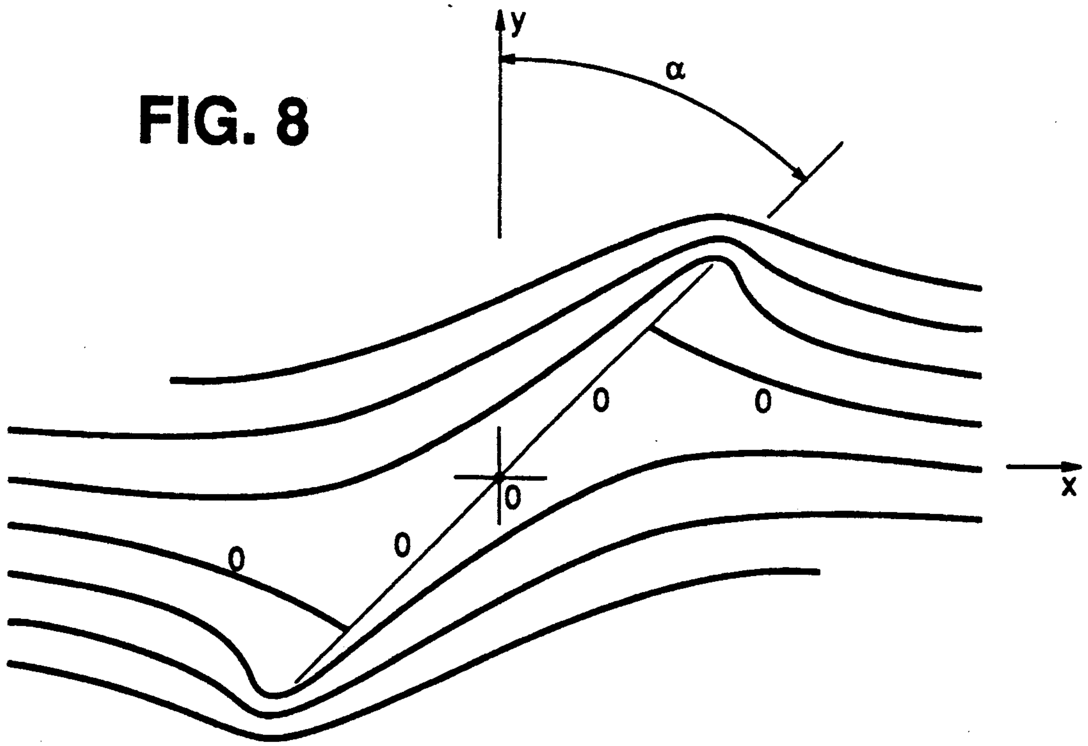
FIG. 8 shows the equipotential lines around the strip the angle $\alpha=45°$.

FIGS. 7 and 8 show the equipotential lines of the field around the strip in the two cases $\alpha=0$ and $\alpha=\pi/4$. In both cases the external equipotential lines $\Phi=0$ intersect the strip at an angle $\pi/2$.

Once the field has been computed in the limit $\mu=\infty$, the field distortion generated by a small value of $\mu_0/\mu$ is obtained by the numerical solution of eq. (27). This is done by dividing $S_h$ in a number n of small elements of surfaces $\delta S_m$. Eq. (27) transforms to $$-\frac{1}{4\pi}\sum_{m=1}^{N}\delta\sigma_m \nabla_k\left(\frac{1}{\rho}\right)\cdot\vec{n}_k\delta S_m = \frac{\mu_0}{\mu}\sigma_k \quad (66)$$

where $\delta\sigma$ so is the average value of $\delta\sigma$ on the element of surface $\delta S_m$, $\vec{n}_k$ is the unit vector perpendicular to the element of surface $\delta S_k$, $\nabla_k$ is the gradient computed at a point infinitely close to the element of surface $\delta S_k$ and inside $S_h$, and $\rho$ is the distance between the centers of $\delta S_k$ and $\delta S_m$. Thus eqs. (53) are the n equations in the n variables $\delta\sigma_m$.

The system of eqs. (12) and (13) provides the exact solution of the field generated by an arbitrary distribution of remanences in a transparent medium ($\chi_m=0$) limited by a number of surfaces of infinite magnetic permeability materials and arbitrary geometries.

In a structure of media of uniform values of $\chi_m$ and $\mu$, the solution of eqs. (23) and (24) is proportional to $\chi_m$ and the solution of eq. (32) is proportional to $\mu_0/\mu$. Thus the scalar potential at each point P of the magnetic structure is $$\Phi(P) = \Phi_0(P) + \psi_1(P)\chi_m + \psi_2(P)\frac{\mu_0}{\mu} \quad (67)$$

where $\Phi_0$ is the potential in the ideal case $\chi_m=0$ and $\mu_0=0$, and $\psi_1$, $\psi_2$ are functions of position which are determined by $\Phi_0$, independent of $\chi_m$ and $\mu_0/\mu$. Usually, the rare earth magnetic materials exhibit values of the order of $10^{-2}$ and the linear range of the characteristic values of $\mu_0$ of the order of $10^{-3}$ or smaller.

Thus, outside of the ferromagnetic components of the structure one can expect the demagnetization characteristic to be the dominant factor in the field perturbation.

An example of the numerical solution is the field computation in the two-dimensional problems of a high permeability material whose cross section is the equilateral hexadecagon shown in FIG. 9 with sides tangent to an ellipse with 2:1 ratio between axes. The external uniform field of intensity $\vec{H}_0$ is oriented at an angle $\pi/4$ with respect to the axis of the ellipse. The equipotential surface $\Phi=0$ of the external field is assumed to contain the axes of the polyhedron.

The field corresponding to a finite ($\mu_0/\mu=0.5$) magnetic permeability, computed according to equation (45), is plotted in FIG. 10.

An example of multiplicity of high permeability components is the two-dimensional structure shown in FIG. 11. The two lined rectangular areas represent the magnetic material uniformly magnetized in the direction of the y axis. The heavy lines represent the cross-sections of four components of zero thickness and infinite permeability.

The field configuration derived from the numerical solution of equation (31) is shown in FIG. 12. In this figure the equipotential lines are plotted in the first quadrant of the structure of FIG. 11. The numerical solution is shown for $y_1=2y_0=x_0$. The x axis is a $\Phi=0$ equipotential line within the region of the magnetized material that intersects the x axis at a point X that becomes a saddle point of the equipotential lines. The numerical values of the potentials are $\Phi_1=-\Phi_2=-0.248$, $\Phi_3=-\Phi_4=0.277$.

FIG. 13 illustrates the field configuration in the case of separation of the inclined sides. As can be seen, the surfaces acquire a potential different from the configuration shown in the previous example.

Figure 15:
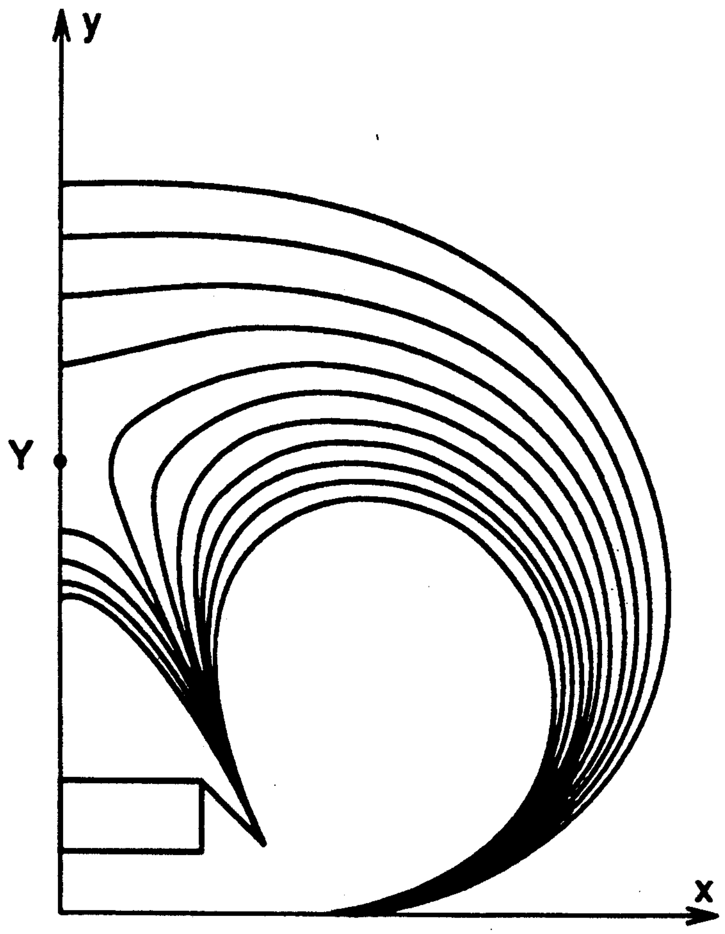
FIG. 15 illustrates the field configuration outside of the structure under the condition $\Phi_3=\Phi_4=0$.

If $S_3$ and $S_4$ are assumed to be connected to each other at infinity, FIG. 11 may be considered as the ideal schematization of a yoked magnet. In this case both $\Phi_3$ and $\Phi_4$ are zero. FIG. 14 shows the equipotential lines of the field computed within the structure and FIG. 15 shows the field outside. Point Y on the y axis is a saddle point of the field configuration. The field in the region between surfaces $S_1$ and $S_2$ has approximately the same magnitude as the field within the magnetized material. This is the result of enclosing the magnetized material within the yoke formed by the surfaces $S_3$ and $S_4$.

Figure 18:
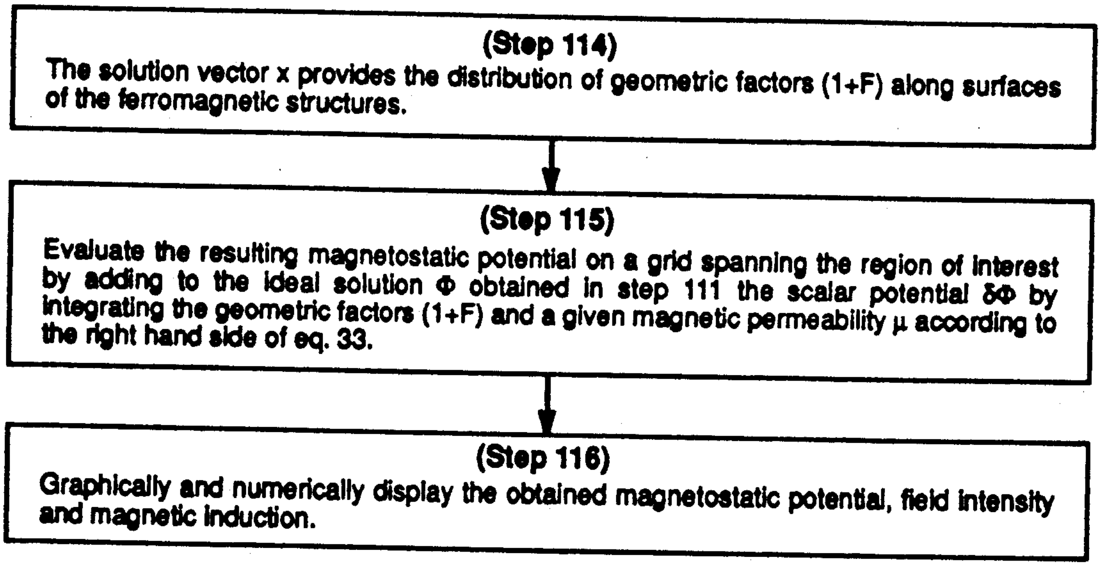

FIGS. 16, 17 and 18 are self explanatory flow diagrams illustrating an example of the invention. As noted, FIG. 17 constitutes a continuation of FIG. 16, and FIG. 18 constitutes a continuation of FIG. 17.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A method for constructing a permanent magnetic structure with linear magnetic characteristics, comprising specifying dimensional parameters of a permanent magnetic structure having interfaces between magnetized regions, predetermined remanence and susceptibility characteristics, determining the surface charges $\sigma$ at each interface of the magnetized regions, dividing the surface of the structure into a plurality of predetermined surface regions with each of said regions having a defined point, determining the distribution of said surface charges on all of the interfaces, computing the surface charges $\sigma$, then computing the field everywhere using the calculated surface charges, then repeating said steps of specifying dimensional parameters, determining surfaces charges, dividing, and determined the distribution of said surface charges until said computed field is a determined value, and then fabricating a permanent magnetic structure in accordance with the last specified dimensional parameters.

2. A method for constructing a permanent magnetic structure comprised of components of both magnetic and ferromagnetic materials, with linear magnetic characteristics, comprising specifying dimensional parameters of a permanent magnetic structure having interfaces between magnetized regions, assuming infinite permeability of the ferromagnetic components, determining surface charges at each said interface, formulating a set of linear equations of said structure in terms of the scaler potential, determining charge elements of said structure from said charge equations, determining the field of said structure from said elements, then repeating said steps of specifying dimensional parameters, determining surface charges, formulating a set of linear equations, determining charge elements, and determining the field until the determined field is a desired value, and the fabricating said permanent magnetic structure in accordance with the last specified dimensional parameters.

3. The method of claim 2 wherein said step of determining the field of said structure comprises directly determining the expansion of the magnetostatic potential.

4. A method for constructing a permanent magnetic structure comprised of components of both magnetic and ferromagnetic materials, with linear magnetic characteristics, comprising specifying dimensional parameters of a permanent magnetic structure having interfaces between magnetized regions, assuming finite permeability of the ferromagnetic components, determining the surface charges at each said interface, dividing the interfaces into a plurality of surface regions, formulating a set of linear equations expressing the surface charge elements of said regions in terms of scaler potentials, determining charge elements of said structure from said equations, determining the field of said structure from said charge elements, then repeating said steps of specifying dimensional parameters, determining the surface charges, dividing the interfaces, formulating a set of linear equations, determining charge elements and determining the field of the structure until said determined field has a desired value, and then fabricating a permanent magnetic structure in accordance with the last specified dimensional parameters.

5. The method of claim 4 wherein said step of determining the field of said structure comprises directly determining the expansion of the magnetostatic potential.

6. A method for constructing a permanent magnetic structure comprised of components of both magnetic and ferromagnetic materials, with linear magnetic characteristics, comprising specifying dimensional parameters of a permanent magnetic structure having interfaces between magnetized regions, assuming finite permeability of the ferromagnetic components, determining the surface charges at each said interface, dividing the interfaces into a plurality of surface regions, formulating a set of linear equations expressing surface charges of said structure in terms of the vector field intensities, determining unknown charge elements of said structure from said equations, determining the field of said structure from said charge elements, then repeating said steps of specifying dimensional parameters, determining the surface charges, dividing the interfaces, formulating a set of linear equations, determining unknown charge elements, and determining the field, until a predetermined field is determined, and then fabricating a permanent magnetic structure in accordance with the last specified dimensional parameters.

7. The method of claim 6 wherein said step of determining the field of said structure comprises directly determining the expansion of the magnetostatic potential.

* * * * *